United States Patent
Lin et al.

(10) Patent No.: US 9,477,340 B2
(45) Date of Patent: Oct. 25, 2016

(54) ON-CELL CAPACITIVE TOUCH PANEL

(71) Applicant: Raydium Semiconductor Corporation, Hsinchu (TW)

(72) Inventors: Kuan-Ming Lin, Hsinchu (TW); Yi-Ying Lin, Hualien County (TW); Hsin-Wei Shieh, New Taipei (TW); Kun-Pei Lee, Miaoli County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 0 days.

(21) Appl. No.: 14/693,494

(22) Filed: Apr. 22, 2015

(65) Prior Publication Data

US 2015/0309638 A1 Oct. 29, 2015

(30) Foreign Application Priority Data

Apr. 24, 2014 (TW) .............................. 103114880 A

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01); *G06F 2203/04111* (2013.01)

(58) Field of Classification Search
CPC ................... G06F 2203/04111; G06F 3/0412; G06F 3/044
See application file for complete search history.

(56) References Cited

U.S. PATENT DOCUMENTS

| | | | | |
|---|---|---|---|---|
| 2014/0111473 A1* | 4/2014 | Yang | ....................... | G06F 3/044 345/174 |
| 2014/0168536 A1* | 6/2014 | Guo | ....................... | G06F 3/044 349/12 |
| 2014/0332361 A1* | 11/2014 | Huang | ............... | H03K 17/9622 200/5 A |
| 2015/0029134 A1* | 1/2015 | Liu | ......................... | G06F 3/044 345/174 |
| 2015/0169105 A1* | 6/2015 | Tung | ....................... | G06F 3/044 345/174 |

* cited by examiner

*Primary Examiner* — Andrew Sasinowski
*Assistant Examiner* — Chun-Nan Lin

(57) ABSTRACT

An on-cell capacitive touch panel is disclosed. The capacitive touch panel includes a laminated structure. The laminated structure includes a LCD module, a touch sensing module, and a polarizing module. The touch sensing module is disposed on the LCD module. The polarizing module is disposed on the touch sensing module. The touch sensing module includes a touch sensor pattern. The touch sensor pattern has a single-layer ITO structure and includes at least one first electrode and at least one second electrode. The at least one first electrode is arranged along a first direction and the at least one second electrode is arranged along a second direction. The first direction and the second direction are two mutually perpendicular directions.

11 Claims, 4 Drawing Sheets

1

| |
|---|
| 18 |
| 16 |
| 14 |
| 12 |
| 10 |

| |
|---|
| 14 |
| 12 |
| 10 |

FIG. 2 (PRIOR ART)

ON-CELL CAPACITIVE TOUCH PANEL

BACKGROUND OF THE INVENTION

1. Field of the Invention

This invention relates to a touch panel, especially to an on-cell capacitive touch panel having appropriately designed touch sensor patterns capable of effectively suppressing the generation of reverse signals without cover lens and optical clear adhesive (OCA)/optical clear resin (OCR) to avoid poor multi-touch sensing.

2. Description of the Related Art

In general, the laminated structures of capacitive touch panels can be divided into several types. Among these types, the on-cell capacitive touch panel includes a touch sensor layer disposed on the glass of the display panel and has an advantage of display and touch integration to achieve the effect of light and thin. Users can directly perform a touch operation on the display panel of the electronic product without cover lens.

Please refer to FIG. 1 and FIG. 2. FIG. 1 and FIG. 2 illustrate two different laminated structures of the on-cell capacitive touch panel respectively. The difference between the laminated structure 1 of FIG. 1 and the laminated structure 2 of FIG. 2 is that the laminated structure 1 of FIG. 1 includes cover lens 18 and optical clear adhesive (OCA)/optical clear resin (OCR) 16, but the laminated structure 2 of FIG. 2 does not include them.

Although the laminated structure 2 of FIG. 2 without the cover lens and the OCA/OCR can achieve effects of simplifying laminated structure, reducing thickness, and saving costs, stronger reverse signals will be generated and multi-touch sensing of the touch panel will become poor.

For example, as shown in FIG. 3, two touch points P1 and P2 are located at the upper left corner and the upper right corner of the touch panel TP having the laminated structure 2 instead of being located at the same axis, and reverse signals are generated at a first location R1 of the lower left corner of the touch panel TP and a second location R2 of the lower right corner of the touch panel TP. Therefore, the touch signals at the two touch points P1 and P2 will not be canceled out by the reverse signals.

However, as shown in FIG. 4, two touch points P3 and P4 are located at the same axis of the touch panel TP having the laminated structure 2, and reverse signals are generated at locations R3 and R4 overlapping the two touch points P1 and P2. Therefore, the touch signals at the two touch points P3 and P4 will be canceled out by the reverse signals and multi-touch sensing of the touch panel TP will become poor.

Therefore, the invention provides an on-cell capacitive touch panel to solve the above-mentioned problems.

SUMMARY OF THE INVENTION

A preferred embodiment of the invention is an on-cell capacitive touch panel. In this embodiment, the on-cell capacitive touch panel includes a laminated structure. The laminated structure includes a LCD module, a touch sensing module, and a polarizing module. The touch sensing module is disposed on the LCD module. The polarizing module is disposed on the touch sensing module. The touch sensing module includes a touch sensor pattern. The touch sensor pattern has a single-layer ITO structure and includes at least one first electrode and at least one second electrode. The at least one first electrode is arranged along a first direction and the at least one second electrode is arranged along a second direction. The first direction and the second direction are two mutually perpendicular directions.

In an embodiment, a width of the at least one first electrode ranges between 150 um and 450 um.

In an embodiment, a width of the at least one second electrode ranges between 150 um and 450 um.

In an embodiment, the at least one first electrode further includes a first extending electrode and the at least one second electrode further includes a second extending electrode.

In an embodiment, the first extending electrode and the second extending electrode are both L-shaped.

In an embodiment, widths of the first extending electrode and the second extending electrode range between 40 um and 100 um.

In an embodiment, the first extending electrode includes a first section and a second section connected in order, the second extending electrode includes a third section and a fourth section connected in order, the first section is parallel to the at least one second electrode and the second section is parallel to the at least one first electrode, the third section is parallel to the at least one first electrode and the fourth section is parallel to the at least one second electrode.

In an embodiment, a distance between the first section and the fourth section ranges between 40 um and 100 um.

In an embodiment, a distance between the second section and the third section ranges between 40 um and 100 um.

In an embodiment, the at least one first electrode further includes a first edge electrode and the at least one second electrode further includes a second edge electrode, the first edge electrode is farther away from a center of the touch sensor pattern than the first extending electrode and the second edge electrode is farther away from the center of the touch sensor pattern than the second extending electrode.

In an embodiment, the first edge electrode includes a first section, a second section, a third section, and a fourth section connected in order, the second edge electrode includes a fifth section and a sixth section connected in order, the first section, the third section, and the sixth section are parallel to the at least one second electrode and the second section, the fourth section, and the fifth section are parallel to the at least one one first electrode.

In an embodiment, a width of the first edge electrode ranges between 40 um and 100 um.

In an embodiment, a width of the fifth section ranges between 40 um and 100 um and a width of the sixth section ranges between 150 um and 450 um.

In an embodiment, a distance between the fourth section and the fifth section ranges between 40 um and 100 um.

In an embodiment, a distance between the second section and the sixth section ranges between 40 um and 100 um.

In an embodiment, a distance between the third section and the sixth section ranges between 40 um and 100 um.

In an embodiment, a conductive material of the plurality of touch sensor patterns is indium tin oxide (ITO), nano-silver, or carbon nanotubes.

Compared to the prior art, the on-cell capacitive touch panel of the invention having appropriately designed touch sensor patterns is capable of effectively suppressing reverse signals without cover lens and OCA/OCR to avoid poor multi-touch sensing.

The advantage and spirit of the invention may be understood by the following detailed descriptions together with the appended drawings.

BRIEF DESCRIPTION OF THE DRAWINGS

FIG. 1 and FIG. 2 illustrate two different laminated structures of the on-cell capacitive touch panel respectively.

DETAILED DESCRIPTION

A preferred embodiment of the invention is an on-cell capacitive touch panel.

In this embodiment, the on-cell capacitive touch panel includes a laminated structure without cover lens and OCA/OCR as the laminated structure 2 shown in FIG. 2, but not limited to this.

As shown in FIG. 2, the laminated structure 2 includes a LCD module 10, a touch sensing module 12, and a polarizing module 14. The touch sensing module 12 is disposed on the LCD module 10. The polarizing module 14 is disposed on the touch sensing module 12. In fact, the polarizing module 14 can be a polarizer, but not limited to this.

Figure 3:
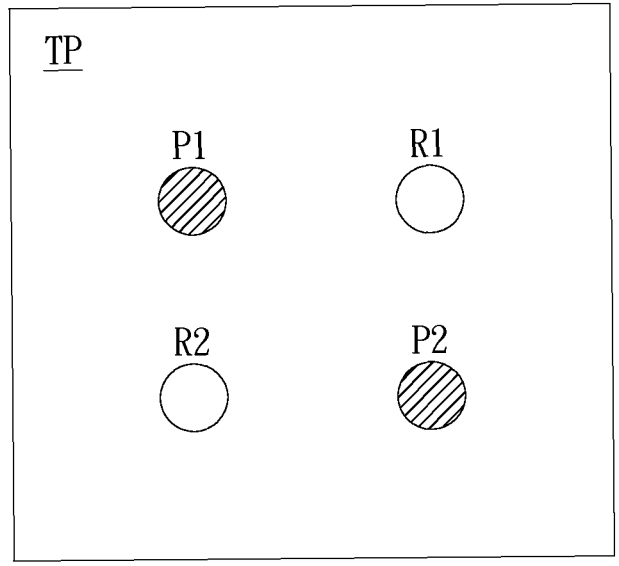
FIG. 3 illustrates locations reverse signals are generated when two touch points are located at the upper left corner and the upper right corner of the touch panel having the laminated structure.
Figure 4:
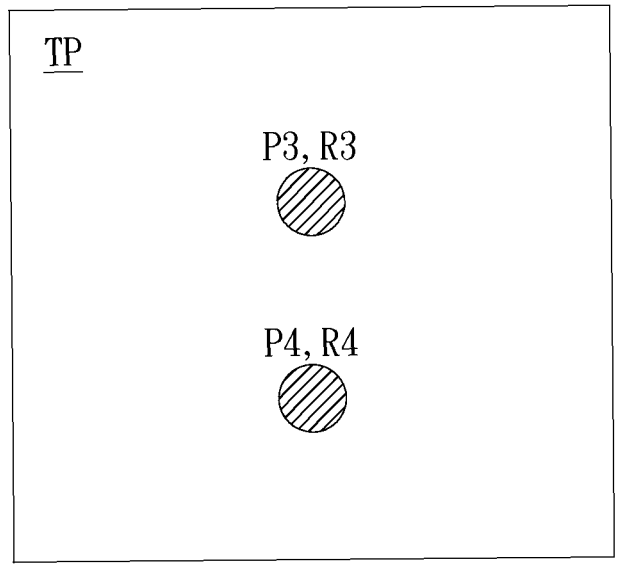
FIG. 4 illustrates locations reverse signals are generated when two touch points are located at the same axis of the touch panel having the laminated structure.
Figure 5:
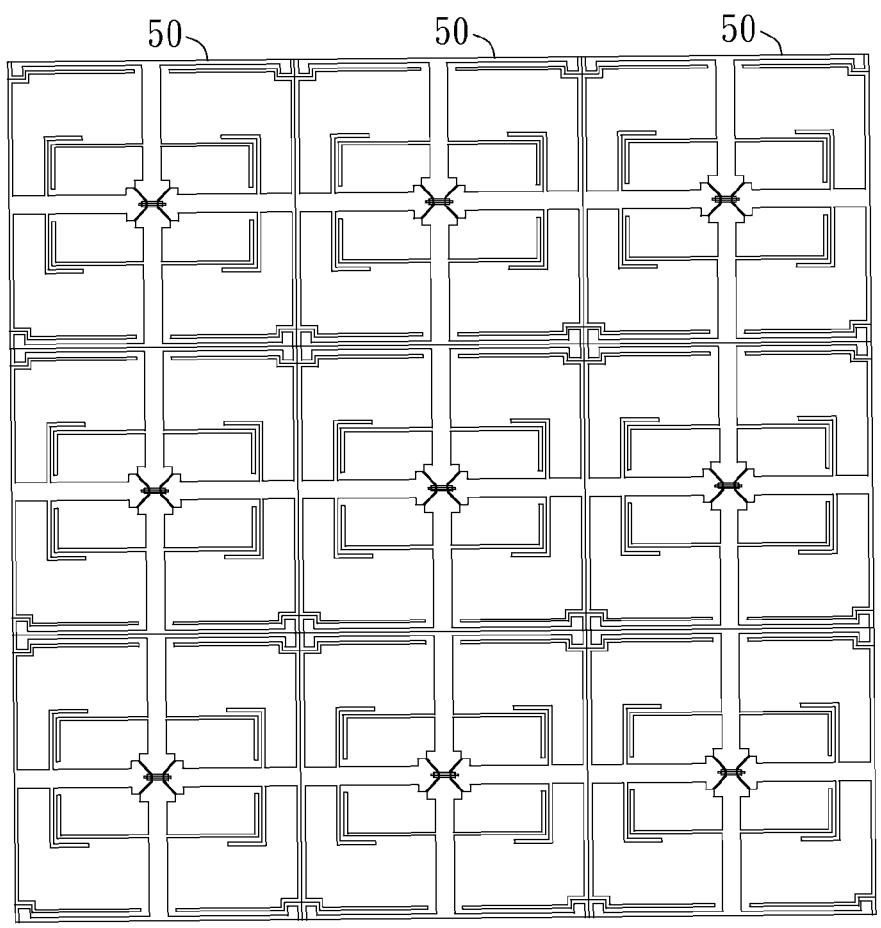
FIG. 5 illustrates a schematic diagram of the on-cell capacitive touch panel including a plurality of same touch sensor patterns in a preferred embodiment of the invention.

Please refer to FIG. 5. FIG. 5 illustrates a schematic diagram of the on-cell capacitive touch panel 5 including a plurality of same touch sensor patterns 50 in this embodiment. As shown in FIG. 5, the touch sensing module in the laminated structure of the on-cell capacitive touch panel 5 includes nine same touch sensor patterns 50 aligned in a (3*3) type, but not limited to this. It should be noticed that although the geometric lines of the touch sensor patterns 50 in FIG. 5 are all straight lines, but the geometric lines are not limited to this. In fact, the geometric lines of the touch sensor patterns 50 can be any curves having different curvatures or any regular shapes or irregular shapes based on practical needs.

In this embodiment, the touch sensor pattern 50 has a single-layer ITO (SITO) structure. A conductive material of the touch sensor pattern 50 can be thin-film translucent conductive material such as indium tin oxide (ITO), nano-silver, or carbon nanotubes, but not limited to this. The touch sensor pattern 50 includes first electrodes arranged along a first direction and second electrodes arranged along a second direction. The first direction and the second direction are two mutually perpendicular directions.

It should be noticed that the first electrode is a sensing electrode and the second electrode is a driving electrode, or the first electrode is a driving electrode and the second electrode is a sensing electrode.

Figure 6:
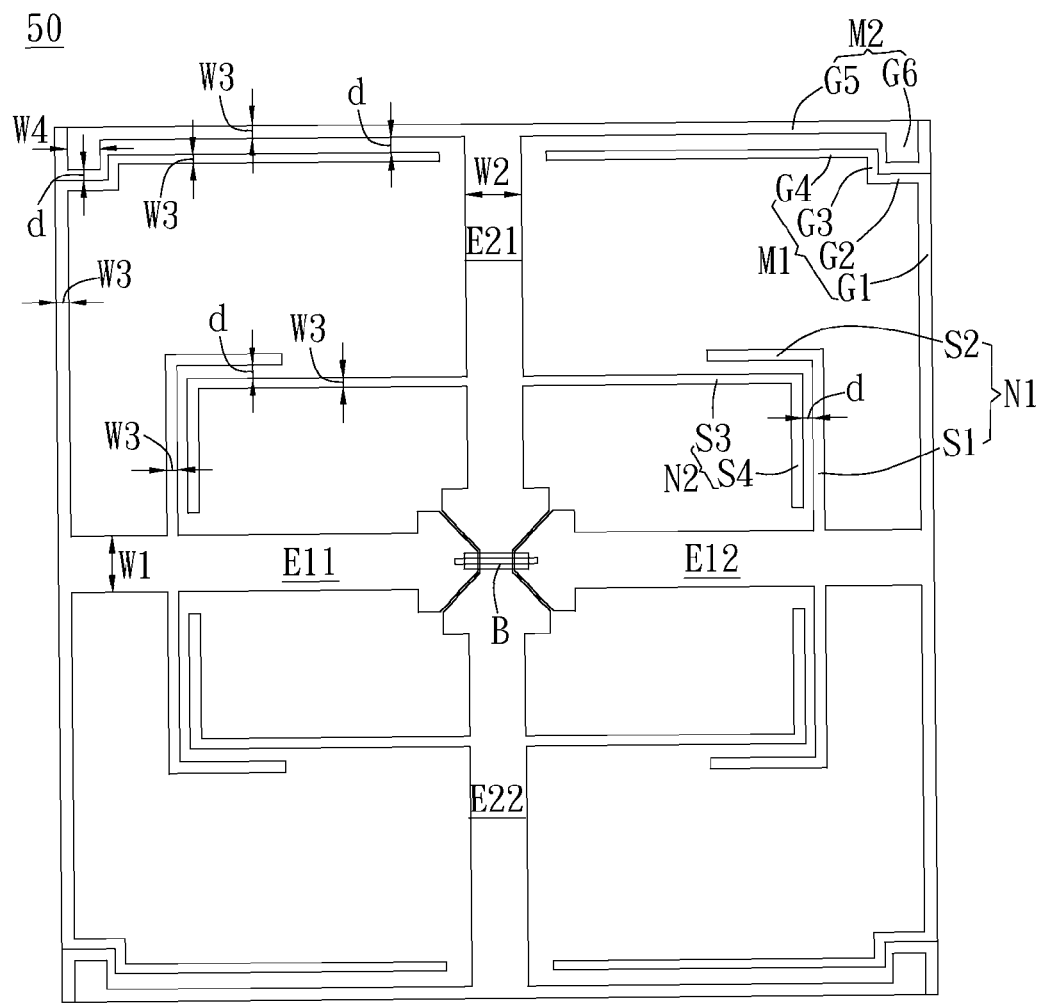
FIG. 6 illustrates a schematic diagram of the touch sensor pattern of FIG. 5.

As shown in FIG. 6, the touch sensor pattern 50 includes first electrodes E11~E12 arranged along the first direction (the horizontal direction) and second electrodes E21~E22 arranged along the second direction (the vertical direction). As shown, the first direction (the horizontal direction) and the second direction (the vertical direction) are two mutually perpendicular directions.

In this embodiment, the first electrodes E11 and E12 are coupled by a bridging unit B; the second electrodes E21 and E22 are directly coupled. A width W1 of the first electrodes E11 and E12 can range between 150 um and 450 um; a width W2 of the second electrodes E21 and E22 can range between 150 um and 450 um, but not limited to this.

As shown in FIG. 6, the first electrode E11 (E12) includes a first extending electrode N1 and the second electrode E21 (E22) includes a second extending electrode N2. The first extending electrode N1 and the second extending electrode N2 are both L-shaped, but not limited to this. In this embodiment, a width W3 of the first extending electrode N1 and the second extending electrode N2 can range between 40 um and 100 um, but not limited to this.

The first extending electrode N1 includes a first section S1 and a second section S2, and the first section S1 and the second section S2 are connected in order; the second extending electrode N2 includes a third section S3 and a fourth section S4, and the third section S3 and the fourth section S4 are connected in order. The first section S1 is parallel to the second electrode E21 (E22) and the fourth section S4; the second section S2 is parallel to the first electrode E11 (E12) and the third section S3.

In this embodiment, a distance d between the first section S1 and the fourth section S4 can range between 40 um and 100 um; a distance d between the second section S2 and the third section S3 can range between 40 um and 100 um, but not limited to this.

In addition, the first electrode E11 (E12) also includes a first edge electrode M1 and the second electrode E21 (E22) also includes a second edge electrode M2. The first edge electrode M1 is farther away from a center of the touch sensor pattern 50 than the first extending electrode N1, and the second edge electrode M2 is farther away from the center of the touch sensor pattern 50 than the second extending electrode N2. In this embodiment, the center of the touch sensor pattern 50 is about the location of the bridging unit B, but not limited to this.

The first edge electrode M1 includes a first section G1, a second section G2, a third section G3, and a fourth section G4, and the first section G1, the second section G2, the third section G3, and the fourth section G4 are connected in order; the second edge electrode M2 includes a fifth section G5 and a sixth section G6, and the fifth section G5 and the sixth section G6 are connected in order. The first section G1, the third section G3, and the sixth section G6 are parallel to the second electrode E21 (E22) and the second section G2, the fourth section G4, and the fifth section G5 are parallel to the first electrode E11 (E12).

In this embodiment, a width W3 of the first edge electrode M1 can range between 40 um and 100 um; a width W3 of the fifth section G5 of the second edge electrode M2 can range between 40 um and 100 um; a width W4 of the sixth section G6 of the second edge electrode M2 can range between 150 um and 450 um.

In practical applications, a distance between the fourth section G4 and the fifth section G5, a distance between the second section G2 and the sixth section G6, and a distance between the third section G3 and the sixth section G6 are each the distance d ranging between 40 um and 100 um, but not limited to this.

It should be noticed that although the first electrodes E11~E12 and the second electrodes E21~E22 of the touch sensor patterns 50 in FIG. 6 are all straight lines, but not limited to this. In fact, the first electrodes E11~E12 and the second electrodes E21~E22 of the touch sensor patterns 50 can be any curves having different curvatures or any regular shapes or irregular shapes based on practical needs.

Although the laminated structure of the on-cell capacitive touch panel does not include cover lens and OCA/OCR, the on-cell capacitive touch panel 5 includes the same touch sensor patterns 50 as shown in FIG. 6, when the user touch the on-cell capacitive touch panel 5, the on-cell capacitive touch panel 5 can effectively suppress the generation of the reverse signals. Therefore, even several touch points are located at the same axis on the on-cell capacitive touch panel 5, and the locations the reverse signals are generated on the on-cell capacitive touch panel 5 will overlap the touch points, since the reverse signals are weak, the reverse signals fail to cancel out the touch signals at the touch points; therefore, the multi-touch sensing efficiency of the on-cell capacitive touch panel 5 can be effectively improved.

Compared to the prior art, embodiments of the on-cell capacitive touch panel of the invention having appropriately designed touch sensor patterns are capable of effectively suppressing reverse signals without cover lens and OCA/OCR to avoid poor multi-touch sensing.

Above all, embodiments of the on-cell capacitive touch panel of the invention having appropriately designed touch sensor patterns can achieve the following effects:

(1) the laminated structure of the on-cell capacitive touch panel can include no cover lens and OCA/OCR;

(2) the touch sensor patterns of the on-cell capacitive touch panel having a single-layer ITO (SITO) structure include sensing electrodes and driving electrodes, and a conductive material of the touch sensor patterns can be ITO, nano-silver, or carbon nanotubes;

(3) the touch sensor pattern can support 2 mm~6 mm passive stylus.

(4) the reverse signals caused due to no cover lens can be effectively suppressed.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

The invention claimed is:

1. An on-cell capacitive touch panel, comprising:
a laminated structure, comprising:
a LCD module;
a touch sensing module, disposed on the LCD module; and
a polarizing module, disposed on the touch sensing module;
wherein the touch sensing module comprises a plurality of same touch sensor patterns, each touch sensor pattern has a single-layer ITO (SITO) structure and comprises at least one first electrode and at least one second electrode, the at least one first electrode is arranged along a first direction and the at least one second electrode is arranged along a second direction, the first direction and the second direction are two mutually perpendicular directions, the at least one first electrode further comprises a first extending electrode and the at least one second electrode further comprises a second extending electrode, the first extending electrode and the second extending electrode are both L-shaped, the first extending electrode comprises a first section and a second section connected in order, the second extending electrode comprises a third section and a fourth section connected in order, the first section is parallel to the at least one second electrode and the second section is parallel to the at least one first electrode, the third section is parallel to the at least one first electrode and the fourth section is parallel to the at least one second electrode, a distance between the first section and the fourth section ranges between 40 um and 100 um.

2. The on-cell capacitive touch panel of claim 1, wherein a width of the at least one first electrode ranges between 150 um and 450 um.

3. The on-cell capacitive touch panel of claim 1, wherein a width of the at least one second electrode ranges between 150 um and 450 um.

4. The on-cell capacitive touch panel of claim 1, wherein widths of the first extending electrode and the second extending electrode range between 40 um and 100 um.

5. The on-cell capacitive touch panel of 1, wherein a distance between the second section and the third section ranges between 40 um and 100 um.

6. The on-cell capacitive touch panel of claim 1, wherein a conductive material of the plurality of touch sensor patterns is indium tin oxide (ITO), nano-silver, or carbon nanotubes.

7. An on-cell capacitive touch panel, comprising:
a laminated structure, comprising:
a LCD module;
a touch sensing module, disposed on the LCD module; and
a polarizing module, disposed on the touch sensing module;
wherein the touch sensing module comprises a plurality of same touch sensor patterns, each touch sensor pattern has a single-layer ITO (SITO) structure and comprises at least one first electrode and at least one second electrode, the at least one first electrode is arranged along a first direction and the at least one second electrode is arranged along a second direction, the first direction and the second direction are two mutually perpendicular directions, the at least one first electrode further comprises a first extending electrode and the at least one second electrode further comprises a second extending electrode, wherein the at least one first electrode comprises a first edge electrode and the at least one second electrode further comprises a second edge electrode, the first edge electrode is far away from a center of the touch sensor pattern than the first extending electrode and the second edge electrode is far away from the center of the touch sensor pattern than the second extending electrode, the first edge electrode comprises a first section, a second section, a third section, and a fourth section connected in order, the second edge electrode comprises a fifth section and a sixth section connected in order, the first section, the third section, and the sixth section are parallel to the at least one second electrode and the second section, the fourth section, and the fifth section are parallel to the at least one first electrode, a width of the fifth section ranges between 40 um and 100 um and a width of the sixth section ranges between 150 um and 450 um.

8. The on-cell capacitive touch panel of claim 7, wherein a width of the first edge electrode ranges between 40 um and 100 um.

9. The on-cell capacitive touch panel of claim 7, wherein a distance between the fourth section and the fifth section ranges between 40 um and 100 um.

10. The on-cell capacitive touch panel of claim 7, wherein a distance between the second section and the sixth section ranges between 40 um and 100 um.

11. The on-cell capacitive touch panel of claim 7, wherein a distance between the third section and the sixth section ranges between 40 um and 100 um.

* * * * *